Aug. 16, 1966     F. M. WEST     3,266,314
THERMOCOUPLE SUPPORT
Filed June 10, 1963
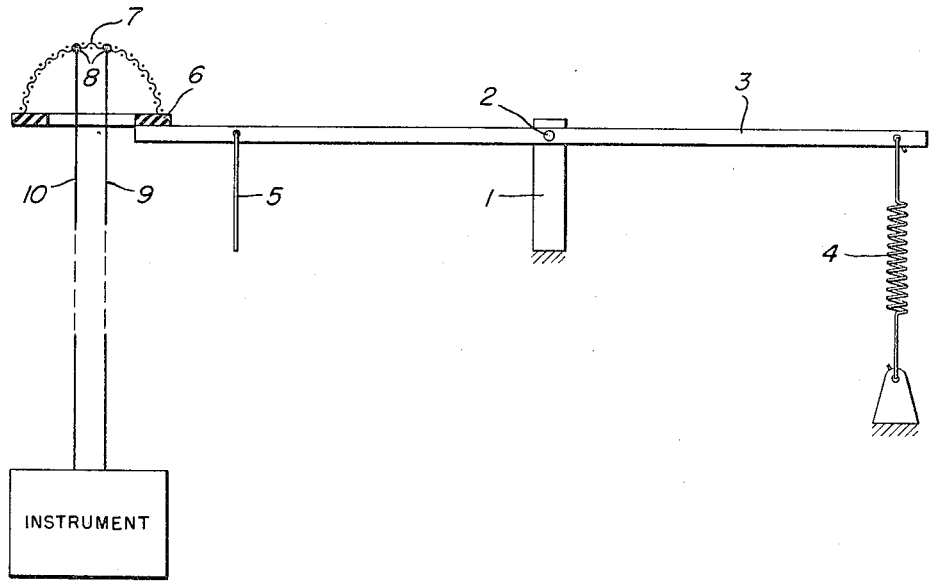
INVENTOR.
FRANK M. WEST
ATTORNEY.

United States Patent Office 3,266,314
Patented August 16, 1966

3,266,314
THERMOCOUPLE SUPPORT
Frank M. West, Swansea, Mass., assignor to Honeywell Inc., a corporation of Delaware
Filed June 10, 1963, Ser. No. 286,713
1 Claim. (Cl. 73—359)

This invention relates to means for measuring the temperature of a surface, such as a pipe.

This invention is even more useful for measuring the temperature of a flat, moving surface, for example, a sheet of cloth, paper, plastic, or the like.

It is an object of this invention to provide a thermocouple having a hot junction of small mass supported by means for maintaining the hot junction of the thermocouple in contact with the surface whose temperature is to be measured, which means comprise a mesh of metallic material.

More specific objects of this invention are to provide means for supporting the hot junction of a thermocouple in contact with a surface, which means comprise a mesh of stainless steel on which the hot junction of the thermocouple is mounted, the mesh being bent to provide a spherical, parabolic, cylindrical or other curved surface.

An additional object of this invention is to provide relative movement between said hot junction and said surface.

A better understanding of the present invention may be had when read in connection with the accompanying drawing, in which:

The single figure of the drawing is a diagrammatic side elevation with parts in vertical, cross section of the thermocouple and support therefor.

A support 1, such as a post, carries a pin 2 on which is pivotally mounted a beam 3 to one end of which a tension spring 4 is attached so as to cause the opposite end of the beam 3 to be biased for movement in a clockwise direction as seen in the drawing. A cable 5 may be manually operated to move the beam 3 in a counterclockwise direction.

At the opposite end of beam 3 from spring 4 is mounted a base 6 on which is mounted a support 7 comprising a mesh of stainless steel. Support 7 may be shaped as a truncated surface of revolution such as spherical, parabolic, or cylindrical.

At a curved surface of the support 7 is located the hot junction 8 of a thermocouple. One or more such hot junctions can be employed. This hot junction is formed by joining the one end of each of two wires 9 and 10 of different materials. The hot junction 8 may be connected to the support 7 by silver solder or the like. Wires 9 and 10 are connected to a measuring instrument which measures the variable current put out by the thermocouple. The hot junction 8 has a low mass. It is formed by placing one end of each of the thermocouple wires 9 and 10 in adjacent or near by openings in the mesh or support 7 and flowing enough silver solder around these wires to anchor them in place. The amount of silver solder has to be kept to a minimum in order to assure the minimum mass and the quickest response. The excess metal is filed away at the hot junction and smoothed with crocus cloth. The hot junction is grounded to the wire mesh or support 7.

The device is placed so that the spring 4 biases the thermocouple hot junction 8 into contact with the surface whose temperature is to be measured, such as the flat, moving surface of a sheet of cloth, paper or plastic. Support 7 presses hot junction 8 against the surface whose temperature is to be measured and provides the necessary floatation to keep the low-mass, hot junction from snagging.

Since the thermocouple has a small mass at the hot junction, it is capable of high sensitivity and accuracy. The smooth surface of the small hot junction minimizes errors usually caused by friction. Heat dissipation from the thermocouple hot junction is low because the mass of the mesh supporting the thermocouple is small.

What is claimed is:

A thermocouple, including, lead wires, a support comprising a mesh of metallic material of a curved-shaped configuration, a hot junction comprising a first wire made of one metallic material forming an extension of one of the lead wires, a second wire made of a different metallic material forming an extension of another one of the lead wires, the free ends of said first and second wires being positioned to contact spaced-apart portions of the mesh and an electrically conductive solder extending along the mesh between the ends of the first and second wires, a base supporting said support at a location spaced from the hot junction of the thermocouple, a beam on which said base and the parts carried thereby are mounted, a post on which said beam is pivotally mounted so that said thermocouple hot junction may be rotated about said post as a pivot, a tension spring biasing said thermocouple hot junction for motion in one direction, and a cable for moving said thermocouple hot junction extending along the curved-shaped mesh between the ends of the first and second wires in the opposite direction into contact with a moving object whose outer surface temperature is to be measured.

References Cited by the Examiner

UNITED STATES PATENTS

| 2,480,703 | 8/1949 | Bradner, et al. | 73—351 |
| 3,123,996 | 3/1964 | Musial | 73—359 X |
| 3,143,439 | 8/1964 | Hansen | 73—359 X |

FOREIGN PATENTS

| 925,619 | 3/1955 | Germany. |

OTHER REFERENCES

Review of Scientific Instruments, vol. 20, #9, September 1949, "Surface Temperature Measuring Devices," pages 679, 680.

LOUIS R. PRINCE, Primary Examiner.

D. McGIEHAN, Assistant Examiner.